May 20, 1930.  A. C. HOPKINS  1,759,052
TIRE SPREADING MACHINE
Filed May 31, 1928  3 Sheets-Sheet 1

INVENTOR
Arthur C. Hopkins
BY Chappell & Earl
ATTORNEYS

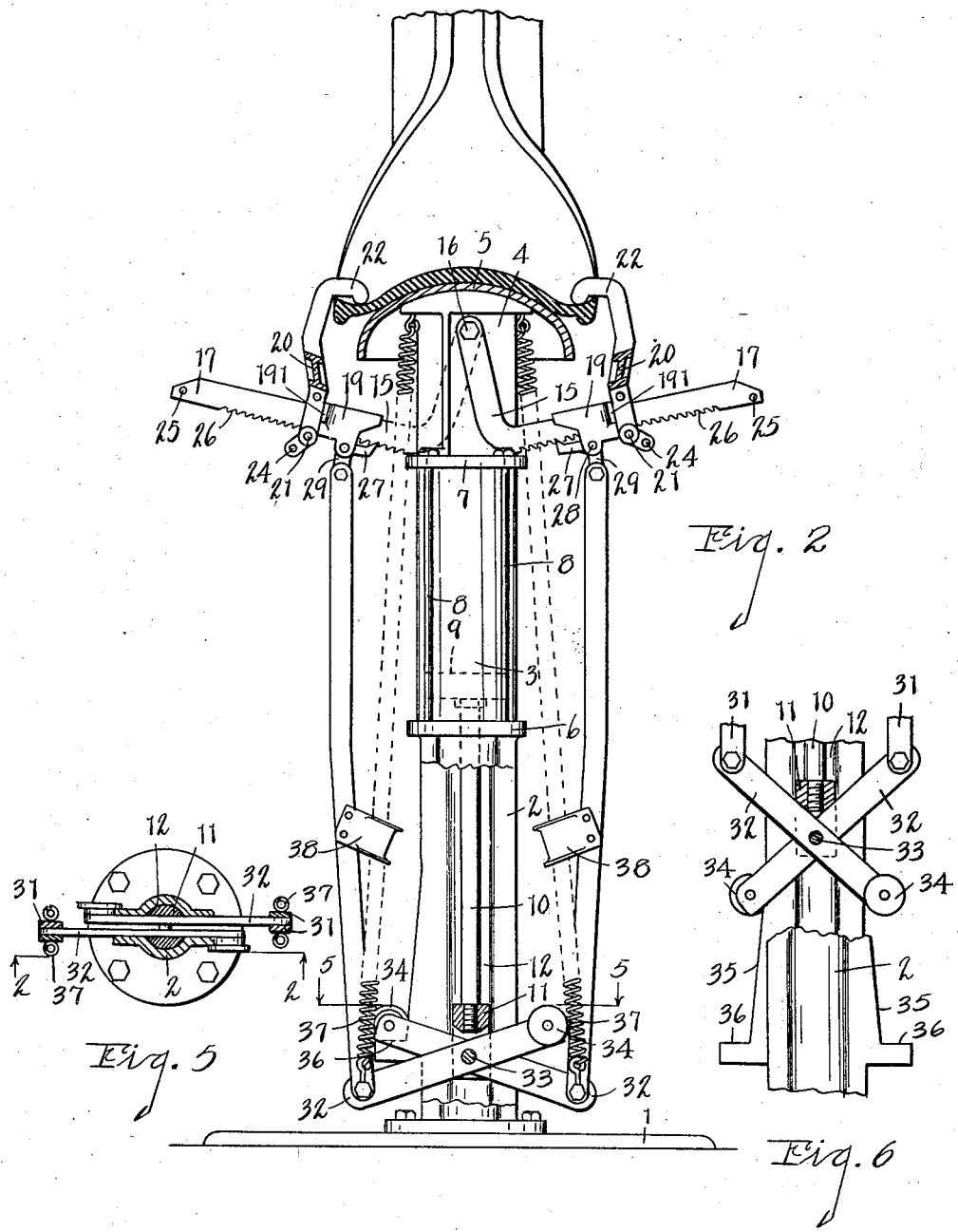

May 20, 1930.  A. C. HOPKINS  1,759,052
TIRE SPREADING MACHINE
Filed May 31, 1928   3 Sheets-Sheet 3
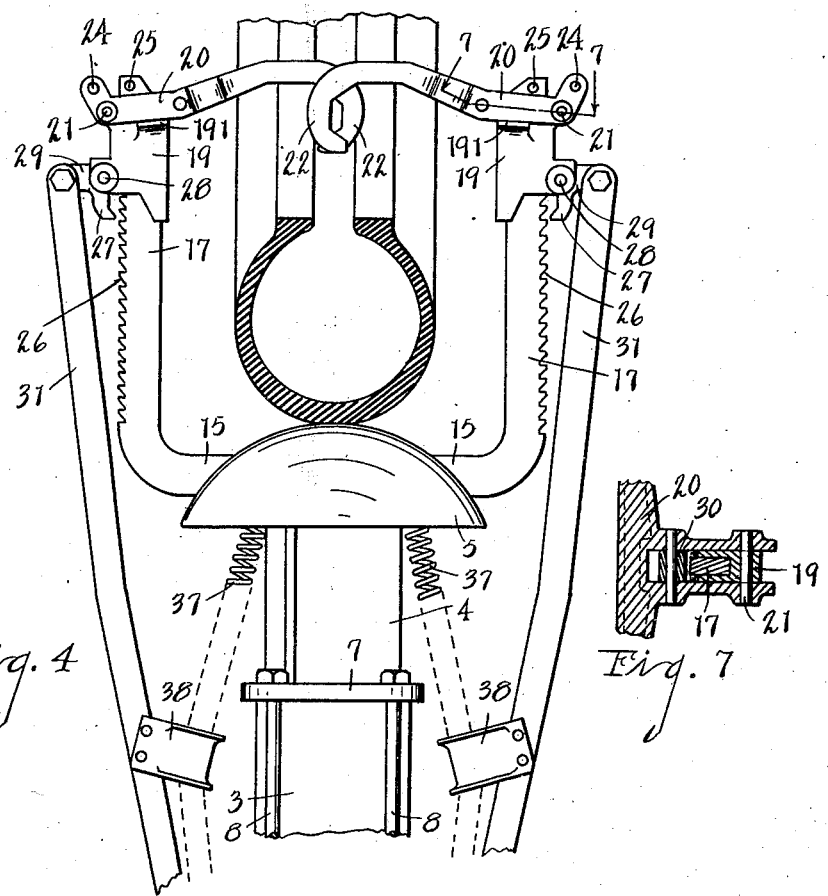
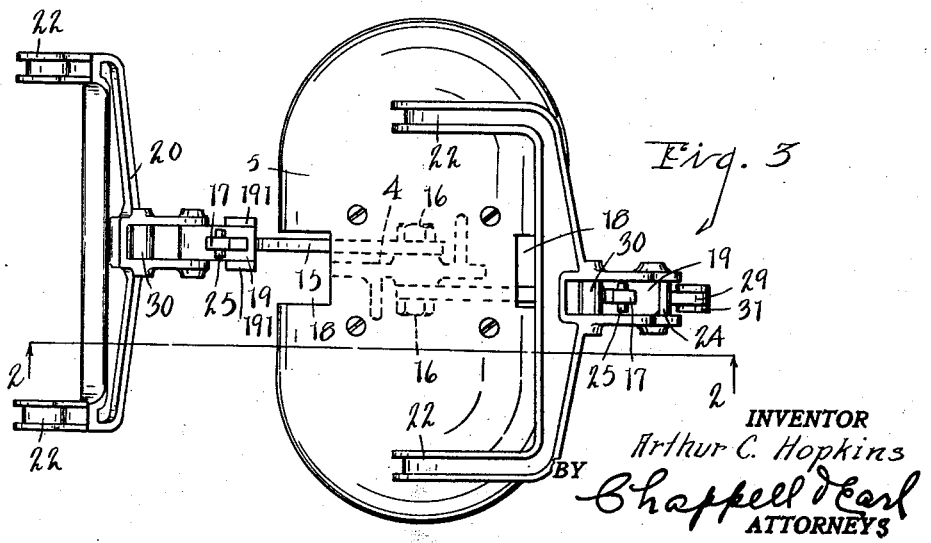
INVENTOR
Arthur C. Hopkins
BY Chappell & Earl
ATTORNEYS Patented May 20, 1930

1,759,052

UNITED STATES PATENT OFFICE

ARTHUR C. HOPKINS, OF NILES, MICHIGAN, ASSIGNOR TO NATIONAL-STANDARD COMPANY, OF NILES, MICHIGAN

TIRE-SPREADING MACHINE

Application filed May 31, 1928. Serial No. 281,628.

The main objects of this invention are:

First, to provide an improved tire spreading machine which automatically adjusts itself to tires of any diameter within its capacity.

Second, to provide a tire spreading machine in which the stress or pull for opening or spreading the tire is substantially in an arc so that the stress upon the tire is uniform.

Third, to provide a tire spreading machine which is very easily and quickly operated and with a minimum of effort on the part of the operator.

Fourth, to provide a tire spreading machine which is of large capacity, and capable of handling heavy tires and tires of large diameter, although very compact.

Objects pertaining to details and economies of my invention will definitely appear from the description to follow. The invention is defined in the claims.

A structure which is a preferred embodiment of my invention is clearly illustrated in the accompanying drawing forming a part of this application, in which:

Fig. 2 is a detail view partially in vertical section on a line corresponding to line 2—2 of Figs. 3 and 5.

Fig. 3 is a plan view with one of the tire engaging members thrown back and the other in position to be lowered into engagement with the work.

Fig. 4 is a fragmentary view showing the tire engaging members in their initial position relative to the work.

Fig. 5 is a detail section on line 5—5 of Fig. 2.

Fig. 6 is a fragmentary side elevation showing certain of the parts in their initial position.

Fig. 7 is a sectional view on line 7—7 of Fig. 4.

Figure 1:
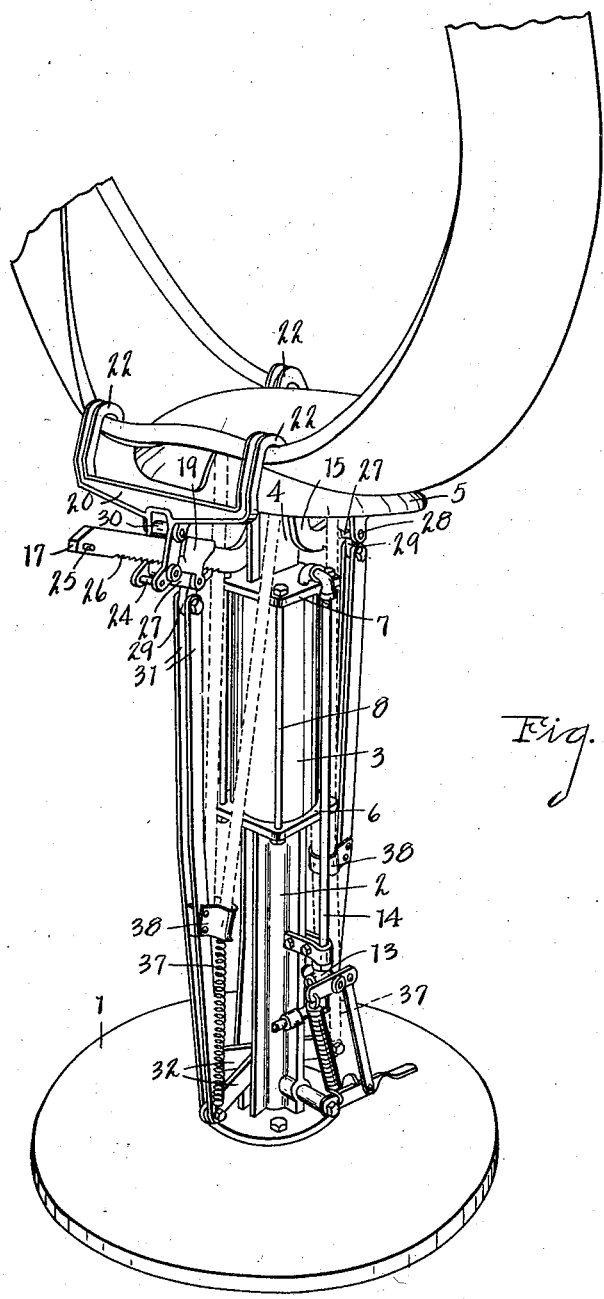
Fig. 1 is a perspective view of my improved tire spreading machine with a tire in open position thereon.

Referring to the drawing, the embodiment illustrated comprises a supporting base 1 having a centrally disposed pedestal 2 thereon. The cylinder 3 is mounted on this pedestal in upright position and carries a head member 4 on which the work support 5 is mounted.

In this embodiment the pedestal 2 is provided with a cylinder head member 6 while the head member 4 is provided with a cylinder head 7, the barrel of the cylinder being clamped between these head members by means of the rods 8.

The plunger 9 is provided with a plunger rod 10 having a crosshead 11 at its lower end reciprocating in the way 12. A valve 13 controls the air supply conduit 14 which is connected to a suitable source of air supply under pressure.

I provide a pair of levers 15 angled substantially as illustrated and pivoted at 16 on the head member 4 centrally below the support so that the outer arms 17 of the levers may be swung upwardly at the sides of the support. The edges of the support are recessed at 18 to receive the levers when in upright position, which is the initial position of the levers, see Fig. 4.

The levers are provided with slides 19 on which the tire engaging members 20 are pivotally mounted at 21. These tire engaging members have spaced hooks 22 adapted to engage the rim of a tire casing as shown in the drawings. The tire engaging members may be swung outwardly to the position shown at the left hand of Fig. 3, stops 24 being provided for limiting this outward swing. These stops 24 engage the outer edges of the slides. Pins 25 prevent the slides from lifting off the ends of the levers.

The arms 17 of the levers are provided with racks 26 while the slides have pawls 27 coacting with these racks. The pawls are pivoted at 28 and provided with outwardly projecting arms 29.

When the rim engaging members are in rim engaging position or swung into position to be lowered into engagement with the rim as shown in Figs. 3 and 4, they are supported by the stops 191 on the slides. As soon, however, as the tire engaging members engage the tire, they are lifted slightly until the rollers 30 are brought into engagement with the inner edges of the arms 17 of the levers, thereby limiting the pivotal movement of the rim engaging members and supporting them so that they swing in a fixed relation to the levers and their pivots; that is, the tire engaging members do not have a pivotal action on the levers during the tire spreading movement thereof. This is a very decided advantage as by the longitudinal movement of the slides and the levers the tire engaging members may be brought into engaging relation with the rim of any tire casing within the capacity of the machine, and it has a very wide range; and on the opening movement of the levers a uniform pull is imparted to the rim throughout the stroke of the levers. The rim is gradually opened with the pull exerted in the arc of a circle, no matter what diameter of tire may be operated upon. This manner of opening or spreading a tire is not likely to injure it.

The levers are connected to the plunger by means of the links 31 which are connected at their upper ends to the arms 29 on the pawls and at their lower ends to the actuating levers 32 which are pivoted at 33 on the plunger rod crosshead 11. The inner ends of these levers are provided with rollers 34 adapted to travel on the downwardly diverging ways 35 until they engage with the stops 36.

This arrangement results in an increased stroke of the links so that the height of the work support is such as enables convenient manipulation of the machine.

The coiled springs 37 connected to the lower ends of the links and to the head member 4 act to return the parts to their initial position. These springs are passed through loops 38 on the links so that they have a tendency to pull the links inward as well as lift them upward. The upward lift of these springs not only returns the levers to upright or initial position, but also moves the slides 19 upwardly on the levers to substantially the position shown in Fig. 4. The rim engaging members are thrown back as shown to the left of Fig. 3 to permit the arrangement of the tire on the support.

On the initial movement of the plunger the parts shown in Fig. 7 travel downwardly on the levers until the tire engaging members engage the tire, the travel, of course, varying according to the size of the tire to be operated upon. Continued movement of the plunger throws the pawls into engagement with the rack so that the slides become fixed to the levers and the rim engaging members are held in substantially fixed relation to the levers so that the pull imparted thereby to a rim is substantially in a uniform arc.

I have illustrated and described my improved tire spreading machine in an embodiment which I have found very practical. I have not attempted to illustrate or describe various modifications and adaptations which I contemplate as it is believed that this disclosure will enable those skilled in the art to embody or adapt my improvements as may be desired.

Having thus described my invention what I claim as new and desire to secure by Letters Patent is:

1. In a structure of the class described, the combination with a pedestal, of a cylinder mounted in a vertical position on said pedestal, a plunger coacting with said cylinder and provided with a downwardly projecting plunger rod, a pair of actuating arms pivotally mounted on said plunger rod, rollers on the inner ends of said actuating arms, said pedestal being provided with downwardly diverging supporting ways for said rollers having stops at their lower ends, a head member provided with a work holder mounted above said cylinder, angled levers having their inner arms pivoted on said head member centrally below said work support and so that their outer arms may swing upwardly at the sides of said work support, the outer arms of said levers being provided with racks, slides on the outer arms of said levers provided with pivoted pawls adapted to coact with said racks, said pawls having outwardly projecting arms, links connecting said arms on said pawls to the outer ends of said actuating arms, tire engaging members pivotally mounted on said slides to swing over the outer arms of said lever provided with parts adapted to coact with the inner edges thereof when the tire engaging members are in tire engaging position whereby they are supported in a substantially fixed relation to the levers during the tire opening movement thereof, and springs connected to said head member and to the outer ends of said actuating arms, said links being provided with loops through which said springs are passed whereby the springs act to lift the outer ends of said actuating arms and disengage said pawls and to urge the said links and parts connected thereto yieldingly inward.

2. In a structure of the class described, the combination with a pedestal, of a cylinder mounted in a vertical position on said pedestal, a plunger coacting with said cylinder and provided with a downwardly projecting plunger rod, a pair of actuating arms pivotally mounted on said plunger rod, rollers on the inner ends of said actuating arms, said pedestal being provided with downwardly diverging supporting ways for said rollers having stops at their lower ends, a head member provided with a work holder mounted above said cylinder, angled levers having their inner arms pivoted on said head member centrally below said work support and so that their outer arms may swing upwardly at the sides of said work support, the outer arms of said levers being provided with racks, slides on the outer arms of said levers provided with pivoted pawls adapted to coact with said racks, said pawls having outwardly projecting arms, links connecting said arms on said pawls to the outer ends of said actuating arms, and tire engaging members pivotally mounted on said slides to swing over the outer arms of said lever provided with parts adapted to coact with the inner edges thereof when the tire engaging members are in tire engaging position whereby they are supported in a substantially fixed relation to the levers during the tire opening movement thereof.

3. In a structure of the class described, the combination of a cylinder, a coacting plunger provided with a downwardly projecting plunger rod, a pair of actuating arms pivotally mounted on said plunger rod, downwardly diverging supporting ways having stops at their lower ends for the inner ends of said arms, a work holder mounted above said cylinder, levers mounted to swing upwardly at the sides of said work support and provided with racks, slides on said levers provided with pivoted pawls adapted to coact with said racks, links connecting said pawls to the outer ends of said actuating arms, tire engaging members pivotally mounted on said slides and provided with parts adapted to support them in a substantially fixed relation to the levers during the tire opening movement thereof, and springs connected to the outer ends of said actuating arms, said links being provided with loops through which said springs are passed whereby the springs act to lift the outer ends of said actuating arms and discharge said pawls and to urge the said links and parts connected thereto yieldingly inward.

4. In a structure of the class described, the combination of a cylinder, a coacting plunger provided with a downwardly projecting plunger rod, a pair of actuating arms pivotally mounted on said plunger rod, downwardly diverging supporting ways having stops at their lower ends for the inner ends of said arms, a work holder mounted above said cylinder, levers mounted to swing upwardly at the sides of said work support and provided with racks, slides on said levers provided with pivoted pawls adapted to coact with said racks, links connecting said pawls to the outer ends of said actuating arms, and tire engaging members pivotally mounted on said slides and provided with parts adapted to support them in a substantially fixed relation to the levers during the tire opening movement thereof.

5. In a structure of the class described, the combination of a work support, a cylinder disposed vertically below said work support and provided with a plunger, angled levers having their inner arms pivotally mounted below said work support and so that their outer arms may swing upwardly at the sides of the work support, the outer arms of said levers being provided with racks, slides on the outer arms of said levers provided with pivoted pawls coacting with said racks, operating connections for said plunger to said pawls, tire engaging members pivotally mounted on said slides, said tire engaging members being adapted to swing over the outer arms of said levers and provided with parts coacting with the inner edges thereof when the tire engaging members are in tire engaging position whereby they are supported in a substantially fixed relation to the levers during the tire opening movement thereof.

6. In a structure of the class described, the combination of a work support, a cylinder disposed vertically below said work support and provided with a plunger, angled levers having their inner arms pivotally mounted below said work support and so that their outer arms may swing upwardly at the sides of the work support, the outer arms of said levers being provided with racks, slides on the outer arms of said levers provided with pivoted pawls coacting with said racks, operating connections for said plunger to said pawls, tire engaging members pivotally mounted on said slides, said tire engaging members being adapted to swing over the outer arms of said levers and provided with parts coacting with the inner edges thereof when the tire engaging members are in tire engaging position whereby they are supported in substantially fixed relation to the levers during the opening movement thereof, and springs acting to return said links.

6. In a structure of the class described, the combination of a work support, a cylinder disposed vertically below said work support and provided with a plunger, angled levers having their inner arms pivotally mounted below said work support and so that their outer arms may swing upwardly at the sides of the work support, the outer arms of said levers being provided with racks, slides on the outer arms of said levers provided with pivoted pawls coacting with said racks, operating connections for said plunger to said pawls, and tire engaging members pivotally mounted on said slides, said tire engaging members being adapted to swing over the outer arms of said levers and provided with parts coacting with the inner edges thereof when the tire engaging members are in tire engaging position whereby they are supported in substantially fixed relation to the levers during the opening movement thereof.

7. In a structure of the class described, the combination of a work support, a cylinder disposed vertically below said work support and provided with a plunger, angled levers having their inner arms pivotally mounted below said work support and so that their outer arms may swing upwardly at the sides of the work support, slides on the outer arms of said levers, operating connections for said plunger to said slides, tire engaging members pivotally mounted on said slides, said tire engaging members being adapted to swing over the outer arms of said levers and provided with parts coacting with the inner edges thereof when the tire engaging members are in tire engaging position whereby they are supported in substantially fixed relation to the levers during the opening movement thereof, and springs acting to return said links.

8. In a structure of the class described, the combination of a work support, a cylinder disposed vertically below said work support and provided with a plunger, angled levers having their inner arms pivotally mounted below said work support and so that their outer arms may swing upwardly at the sides of the work support, slides on the outer arms of said levers, operating connections for said plunger to said slides, and tire engaging members pivotally mounted on said slides, said tire engaging members being adapted to swing over the outer arms of said levers and provided with parts coacting with the inner edges thereof when the tire engaging members are in tire engaging position whereby they are supported in substantially fixed relation to the levers during the opening movement thereof.

9. In a structure of the class described, the combination of a cylinder and coacting plunger, a work support mounted above said cylinder, angled levers pivoted centrally below said work holder and so that their outer arms may swing upwardly at the sides of the work support, the outer arms of said levers being provided with racks, slides on the outer arms of said levers provided with pawls coacting with said racks, tire engaging members mounted on said slides to automatically engage the rim of a tire mounted on said supports as the slides are moved downwardly on the levers, and operating connections from said plunger to said pawls whereby the pawls are engaged with the rack and the lever racks and levers swung outwardly with said tire engaging members traveling in an arc centered in the lever pivots.

10. In a structure of the class described, the combination of a cylinder and coacting plunger, a work support mounted above said cylinder, angled levers pivoted centrally below said work holder and so that their outer arms may swing upwardly at the sides of the work support, slides on the outer arms of said levers, tire engaging members mounted on said slides to automatically engage the rim of a tire mounted on said supports as the slides are moved downwardly on the levers, and operating connections from said plunger to said slides.

11. In a structure of the class described, the combination of a work holder, a pair of opposed levers provided with racks, slides mounted on said levers and provided with pivoted pawls coacting with said racks, actuating links connected to said pawls, tire engaging members pivotally carried by said slides and adapted when in engagement with a tire to maintain a substantially fixed relation to the levers during the tire opening movement thereof, and means acting on said links to urge said levers and the slides thereon to initial position.

12. In a structure of the class described, the combination of a work holder, a pair of opposed levers provided with racks, slides mounted on said levers and provided with pivoted pawls coacting with said racks, actuating links connected to said pawls, and tire engaging members pivotally carried by said slides and adapted when in engagement with a tire to maintain a substantially fixed relation to the levers during the tire opening movement thereof.

13. In a structure of the class described, the combination of a work holder, a pair of opposed levers, slides mounted on said levers, actuating means connected to said slides, tire engaging members carried by said slides and adapted when in engagement with a tire to maintain a substantially fixed relation to the levers during the tire opening movement thereof, and means acting on said actuating means to urge said levers and the slides thereon to initial position.

14. In a structure of the class described, the combination of a work support, levers pivotally mounted to swing upwardly at the sides of said work support and provided with racks, slides on said levers provided with pivoted pawls coacting with said racks, lever actuating means connected to said pawls, and tire engaging members mounted on said slides to be brought into engagement with the rim of a tire on said support and provided with supporting means whereby they are maintained in a substantially fixed relation to the lever pivots during the tire opening movement thereof.

15. In a structure of the class described, the combination of a cylinder and coacting plunger, a work support mounted above said cylinder, levers pivotally mounted below said work support, tire engaging members slidably mounted on said levers so that they may be engaged with the rim of a tire by a longitudinal movement on the levers, operating connections for said plunger to said levers, means for supporting said tire engaging members in a substantially fixed relation on the levers when in tire engaging position, and means acting to return the levers to initial position and move the tire engaging members outwardly on the levers.

16. In a structure of the class described, the combination of a cylinder and coacting plunger, a work support mounted above said cylinder, levers pivotally mounted below said work support, tire engaging members slidably mounted on said levers so that they may be engaged with the rim of a tire by a longitudinal movement on the levers, operating connections for said plunger to said levers, and means for supporting said tire engaging members in a substantially fixed relation on the levers when in tire engaging position.

17. In a structure of the class described, the combination of a work support, an actuating means, a pair of levers, slides on said levers, tire engaging members pivotally mounted on said slides, said tire engaging members being provided with stops coacting with said slides for supporting them in inoperative position, and operating connections for said actuating means to said pawls.

18. In a structure of the class described, the combination of a work support, an actuating means, a pair of levers provided with racks, slides on said levers provided with pawls coacting with said racks, tire engaging members pivotally mounted on said slides, said tire engaging members being provided with stops coacting with said slides for supporting them in inoperative position, and operating connections for said actuating means to said pawls.

19. In a structure of the class described, the combination of a work support, an actuating means, a pair of levers provided with racks, slides on said levers provided with pawls coacting with said racks, tire engaging members pivotally mounted on said slides, and operating connections for said actuating means to said pawls.

20. In a structure of the class described, the combination of a work support, levers provided with racks, slides on said levers provided with pivoted pawls coacting with said racks, tire engaging members carried by said slides, and operating connections for said levers connected to said pawls whereby the pawls are engaged on the actuation of said actuating means.

21. In a structure of the class described, the combination of a work support, levers pivotally mounted to swing upwardly at the sides of said work support, slides on said levers, lever actuating means, and tire engaging members mounted on said slides to be brought into engagement with the rim of a tire on said support and provided with supporting means whereby they are maintained in a substantially fixed relation to the lever pivots during the tire opening movement thereof.

22. In a structure of the class described, the combination of a work support, levers pivotally mounted to swing upwardly at the sides of said work support, slides on said levers, lever actuating means, and tire engaging members mounted on said slides to be brought into engagement with the rim of a tire on said support.

23. In a structure of the class described, the combination of a work support, levers, tire engaging members mounted on said levers so that they may be engaged with the rim of a tire by a longitudinal sliding movement on the levers, means for actuating said levers, and means acting to return the levers to initial position and move the tire engaging members outwardly on the levers.

24. In a structure of the class described, the combination of a work support, levers, tire engaging members mounted on said levers so that they may be engaged with the rim of a tire by a longitudinal sliding movement on the levers, and means for actuating said levers.

25. In a structure of the class described, the combination of a work support, a pair of oppositely disposed levers, tire engaging members slidably mounted on said levers for longitudinal adjustment thereon whereby they may be adjusted to tires of different diameters and maintain a substantially fixed relation to the pivots of the levers on the actuation of the levers, and means for actuating said levers.

26. In a structure of the class described, the combination of a work support, a pair of levers provided with racks, slides mounted on said levers, pawls pivotally mounted on said slides to coact with said racks, tire engaging members pivotally mounted on said slides, rests on said slides for supporting said tire engaging members in position to engage the work as the slides are lowered on the levers, rollers on the tire engaging members adapted to coact with the inner edges of the levers to limit the outward movement thereof when the tire engaging members are in engagement with a tire, and actuating means for said levers connected to said pawls.

27. In a structure of the class described, the combination of a work support, a pair of levers, slides mounted on said levers, tire engaging members pivotally mounted on said slides, rests on said slides for supporting said tire engaging members in position to engage the work as the slides are lowered on the levers, rollers on said tire engaging members adapted to coact with the inner edges of the levers to limit the outward movement thereof when the tire engaging members are in engagement with a tire, and actuating means for said levers.

28. In a structure of the class described, the combination of a work support, a pair of vers provided with racks, slides mounted on said levers, pawls on said slides coacting with said racks, tire engaging members pivotally mounted on said slides, rests on said slides for supporting said tire engaging members in position to engage the work as the slides are lowered on the levers, stops on said tire engaging members adapted to limit the outward movement thereof when the tire engaging members are in engagement with a tire, and actuating means for said levers connected to said pawls.

29. In a structure of the class described, the combination of a work support, a pair of levers, slides mounted on said levers, tire engaging members pivotally mounted on said slides, rests on said slides for supporting said tire engaging members in position to engage the work as the slides are lowered on the levers, stops on said tire engaging members adapted to limit the outward movement thereof when the tire engaging members are in engagement with a tire, and actuating means for said levers.

In witness whereof I have hereunto set my hand.

ARTHUR C. HOPKINS.